United States Patent [19]

Dolecek

[11] Patent Number: 4,720,780

[45] Date of Patent: Jan. 19, 1988

[54] MEMORY-LINKED WAVEFRONT ARRAY PROCESSOR

[75] Inventor: Quentin E. Dolecek, Silver Spring, Md.

[73] Assignee: The Johns Hopkins University, Baltimore, Md.

[21] Appl. No.: 777,112

[22] Filed: Sep. 17, 1985

[51] Int. Cl.$^4$ .............. G06F 15/31; G06F 15/347; G06F 9/38; G06F 13/14

[52] U.S. Cl. .............. 364/200; 340/825.05; 370/61; 364/736

[58] Field of Search ... 364/200 MS File, 900 MS File, 364/736; 340/825.05; 370/61, 86

[56] References Cited

U.S. PATENT DOCUMENTS

| | | | |
|---|---|---|---|
| 4,065,808 | 12/1977 | Schomberg et al. | 364/200 |
| 4,466,064 | 8/1984 | Martin | 364/200 |
| 4,489,381 | 12/1984 | Lavallee et al. | 364/200 |
| 4,495,567 | 1/1985 | Treen | 364/200 |
| 4,498,134 | 2/1985 | Hansen et al. | 364/200 |
| 4,507,726 | 3/1985 | Grimberg et al. | 364/200 |
| 4,509,187 | 4/1985 | Ackland et al. | 381/43 |
| 4,514,807 | 4/1985 | Nogi | 340/200 |
| 4,524,428 | 6/1985 | Grimberg et al. | 364/900 |
| 4,524,455 | 6/1985 | Holsztyncki et al. | 364/200 |
| 4,533,993 | 8/1985 | McCanny et al. | 364/200 |
| 4,543,642 | 9/1985 | Hansen et al. | 364/900 |
| 4,550,437 | 10/1985 | Kobayachi et al. | 364/200 |
| 4,553,203 | 11/1985 | Ram et al. | 364/200 |
| 4,580,215 | 4/1986 | Morton | 364/200 |
| 4,591,980 | 5/1986 | Huberman et al. | 364/200 |
| 4,600,992 | 7/1986 | Boudrean et al. | 364/200 |
| 4,636,942 | 1/1987 | Chen et al. | 364/200 |
| 4,639,857 | 1/1987 | McCanny et al. | 364/200 |
| 4,644,496 | 2/1987 | Andrews | 364/900 |

OTHER PUBLICATIONS

Danielsson et al., "Computer Structure for Image Processing", Academic Press, 1983, pp. 157–178.

*Primary Examiner*—David Y. Eng
*Assistant Examiner*—Thomas C. Lee
*Attorney, Agent, or Firm*—Robert E. Archibald; Howard W. Califano

[57] ABSTRACT

A Memory-Linked Wavefront Array Processor (MWAP) is disclosed which computes a broad range of signal processing, scientific and engineering problems at ultra-high speed. The memory-linked wavefront array processor is an array of identical programmable processing elements linked together by dual-port memory elements that contain a set of special purpose control flags. All communication in the network is done asynchronously via the linking memory elements, thus providing asynchronous global communication with the processing array. The architecture allows coefficients, intermediate calculations and data used in computations to be stored in the linking elements between processing stages. The novel architecture also allows coefficients, intermediate calculations and data to be passed between the processing elements in any desired order not restricted by the order data is to be used by the receiving processing element. Further, each processing element is capable of simultaneous arithmetic computation, multi-direction communication, logic discussions, and program control modifications.

24 Claims, 20 Drawing Figures

| -----PE/MEM #1------ | | | ------PE/MEM #2-------- | | | ------PE/MEM #3------- | | |
|---|---|---|---|---|---|---|---|---|
| READ LEFT | COMPUTE | WRITE RIGHT | READ LEFT | COMPUTE | WRITE RIGHT | READ LEFT | COMPUTE | WRITE RIGHT |
| B31 | | | | | | | | |
| B32 | | | | | | | | |
| B33 | | | | | | | | |
| A13 | | B31 | | | | | | |
| A23 | | B32 | | | | | | |
| A33 | | B33 | | | | | | |
| B21 | | A13 | | | | | | |
| B22 | | A23 | | | | | | |
| B23 | | A33 | B31 | | | | | |
| A12 | | B21 | B32 | | | | | |
| A22 | | B22 | B33 | | | | | |
| A32 | | B23 | A13 | | B31 | | | |
| B11 | | A12 | A23 | | B32 | | | |
| A11 | | A22 | A33 | | B33 | | | |
| | aa=A11*B11 | A32 | B21 | | A13 | | | |
| A21 | | aa | A12 | | A23 | | | |
| | ab=A21*B11 | | aa | A12*B21 | A33 | | | |
| A31 | | ab | A22 | ba=aa+A21*B21 | | B31 | | |
| | ac=A31*B11 | | ab | A22*B21 | ba | A13 | | |
| B12 | | ac | A32 | bb=ab+A22*B21 | | ba | A13*B31 | |
| A11 | | | ac | A32*B21 | bb | A23 | ca=ba+A13*B31 | |
| | aa=A11*B12 | | B22 | bc=ac+A32*B21 | | bb | A23*B31 | C(11)=ca |
| A21 | | aa | A12 | | bc | A33 | cb=bb+A23*B31 | |
| | ab=A21*B12 | | aa | A12*B22 | | bc | A33*B31 | C(21)=cb |
| A31 | | ab | A22 | ba=aa+A12*B22 | | B32 | cc=bc+A33*B31 | |
| | ac=A31*B12 | | ab | A22*B22 | ba | A13 | | C(31)=cc |
| | | ac | A32 | bb=ab+A22*B22 | | ba | A13*B32 | |
| | | | ac | A32*B22 | bb | A23 | ca=ba+A13*B32 | |
| | | | | bc=ac+A32*B22 | | bb | A32*B32 | C(12)=ca |
| | * | | | | bc | A33 | cb=bb+A32*B32 | |
| | | | | * | | bc | A33*B32 | C(22)=cb |
| | * | | | | | | cc=bc+A33*B32 | |
| | | | | * | | | | C(32)=cc |
| | | | | | | | * | |
| | | | | * | | | | |
| | | | | * | | | * | |

FIG. 17

MEMORY-LINKED WAVEFRONT ARRAY PROCESSOR

STATEMENT OF GOVERNMENTAL INTEREST

The Government has rights in this invention, pursuant to Contract No. N000024-85-C-5301, awarded by the Department of the Navy.

BACKGROUND OF THE INVENTION

1. Field of the Invention

The invention relates to an array processor having a unique architecture for computing a broad range of signal processing, scientific, and engineering problems at ultra-high speed. More particularly, the invention called a Memory-Linked Wavefront Array Processor (MWAP) comprises a computing architecture that provides global asynchronous communication within the processing array and also provides local/data driven asynchronous control of each processing element.

2. Description of the Prior Art

Signal processing today requires high computation rates. In many cases the signal processing algorithm is straightforward, but the data rate and subsequent processing overwhelms existing computers and as a result, one is forced to limited application situations and/or long computation times. In the field of engineering there is also a need for improved computer speed and reduced cost. System simulations in the areas of hydrodynamics, aerodynamics, electromagnetics, chemistry and heat transfer are usually limited by computer speed, memory and cost. As a result, full simulations of basic phenomena are frequently not feasible in engineering design. The problem is twofold, first to increase system computation speed by one or two orders of magnitude, and second to design a system applicable to a multiplicity of problems.

The systolic array, introduced by H. T. Kung (see, H.T. Kung, "Let's Design Algorithms for VLSI Systems", in *Proc. Caltech Conf. VLSI*, Jan. 1979, pp. 66-90), is an array of processors that are locally connected and operate synchronously on the same global clock. Algorithms are executed in a pulsed (systolic flow) fashion. That is, the network of processors rhythmically compute and pass data through the system.

The systolic array has the properties of modularity, regularity, local interconnection, and highly pipelined, highly synchronized multiprocessing. However, it requires global synchronization. That is, data movement is controlled by a global timing-reference. In order to synchronize the activities in a systolic array, extra delays are often used to ensure correct timing. For large arrays of processors, synchronization of the entire computing network becomes intolerable or even impossible.

In its classic form, examples of which are shown in FIG. 1, the systolic array is not programmable; each algorithm requires a separate and distinct array configuration. With increased complexity, the systolic array can be made "hardware programmable" by using matrix switches to reconfigure the array geometry. In any case, the systolic array always requires a direct mapping of the computation algorithm onto physical processor elements.

A second attempted solution, the wavefront array processor uses the same geometric structures as the systolic array and is generally described in: S.Y. Kung et al, "Wavefront Array Processor: Architecture, Language and Applications", *MIT Conf. on Advanced Research in VLSI*, Jan. 1982, MIT, Cambridge, MA. It differs from the systolic array in that control flows through the array along with data and parameters. This addition of local control flow to local data-flow permits data-driven, self-timed processing. Conceptually, the requirement of correct "timing" is replaced by the requirement for correct "sequencing".

Every processor element (PE) in a wavefront array processor has a bidirectional buffer with independent status flags for each adjacent PE. The flow of data is asynchronous between PE's with control tokens sent between PE's to determine data availability and data use. This relaxes the strict timing requirement of the systolic array, simplifies algorithm development, and often results in faster algorithms and processing speed. The wavefront processor thus operates by passing control and data between processors in a wavelike fashion so that computation flows from one processor to the next as each processor completes a recursion (step) in the algorithm.

However, both the systolic and wavefront array processors are deficient in that they require local-type communication and can't handle global-type communication. As a result, certain useful algorithms can't be calculated using prior art systolic and wavefront array processors. For example, Fast Fourier Transform, FFT, is calculated using the following recursion formula (the decimation-in-time constant geometry FFT algorithm):

$$x(m+1,p) = x(m,p) + W(k,N)^* x(m,q)$$

$$x(m+1,q) = x(m,p) - W(k,N)^* x(m,q)$$

with p and q varying from stage to stage. Calculation of this algorithm requires global-communication since the distance $|p-q|$ between data points increases from stage to stage. But, systolic and prior art wavefront array processors require the distance between data items to remain constant from processor (stage) to processor. Thus a systolic or wavefront array processor could not be used to calculate FFT using the above recursion formula.

Similarly, the computing capability and flexibility of the prior art array processors is limited because of the requirement that data must pass between the processing elements in the order in which that data is to be used by the receiving processing element. This deficiency in the prior art makes the calculation of certain algorithms difficult and cumbersome.

SUMMARY OF THE INVENTION

The present invention, called a Memory-Linked Wavefront Array Processor (MWAP), extends the wavefront array processor to handle global-type communication. By inserting "smart memory" containing control flags between the processor elements, the memory-linked wavefront array processor relaxes the requirement for strict local communication dictated by the prior art, and therefore permits implementation of the FFT algorithm using the recursion formula. This invention also enlarges the computation power and flexibility of array processors by relaxing the prior art requirement of passing data between the processing elements in the order in which that data is to be used by the receiving processing element.

The MWAP utilizes a new array processing architecture which can compute a broad range of signal processing, scientific, and engineering problems at ultra-high speed. In its most generalized form, the invented MWAP architecture comprises an array of identical programmable processing elements linked together by dual-port memory linking elements that contain a set of special purpose control flags. All communication in the network is done asynchronously via these linking memory elements. Data driven/local control is obtained by using asynchronous handshaking between the processing elements and the dual-port memory linking elements. Moving the asynchronous link to the dual-port memory linking elements permits the use of sequence control "tokens" to be replaced by hardware control flags in each memory linking element. Each processing element is capable of simultaneous arithmetic computation, communication in two directions, logic decisions, and program control modification.

The MWAP has the properties of modularity, regularity, local interconnection, and highly pipelined multiprocessing. Later in this Specification, computation of algorithms using the MWAP architecture are compared to those used for typical prior art systolic and wavefront array processors to illustrate some of the unique capabilities and properties of the MWAP architecture. In general, the MWAP is shown to provide higher throughput rates for most algorithms, to extend the range of algorithms that can be implemented on array processors, and to permit a single linear array configuration to be programmed for a wide variety of algorithms that could previously only be handled on more complex two dimensional prior art systolic and wavefront arrays.

The following is a partial list of novel features found in the present invention:

A first novel feature of the invention is to provide global asynchronous communication within an array of processing elements by linking together adjacent processing elements via asynchronous dual-port memory linking elements.

A second novel feature of the invention is that data can be passed between processing elements in any desired order not restricted by the order that data is to be used by the receiving processing element.

A third novel feature of the invention is that coefficients and other information or data used in calculating an algorithm can be stored in the dual-port memory linking elements between processing stages in an array processor.

A fourth novel feature of the invention is that data-driven/local control of each processing elements is obtained using asynchronous handshaking between each processing element and the dual-port memory linking element located adjacent in the array.

A fifth novel feature of the invention is that moving the asynchronous link to the memory linking elements, permits software sequence control "tokens" to be replaced by hardware control flags located in the memory linking elements.

A sixth novel feature of the invention is that the processing operation of a particular processing element is suspended when it attempts to access a memory location in the adjacent dual-port memory linking element until such time as a control flag associated with such memory location has been set by another processing element adjacent to the particular dual-port memory linking element.

A seventh novel feature of the invention is that each particular processing element has an internal control and bus arrangement which permits simultaneous communication with its adjacent dual-port memory linking elements in the processing array.

An eight novel feature of the present invention is that each processing element can multiply, add or subtract, read or write to its left adjacent memory linking element and read or write to its right adjacent memory linking element, in a linear array, all during the same instruction cycle.

A ninth novel feature of the present invention is that data and computation can be propagated to the right or left in a linear array or to the right or left or up or down in a two dimensional array.

A tenth novel feature of the present invention is that each processing element in the MWAP can store several different program sequences for computing different algorithms, so that different processing elements in an array can perform different computations or the same processing element can perform different computations at different times during the computation cycles.

BRIEF DESCRIPTION OF THE DRAWINGS

In order that the present invention may be more fully understood, it will now be described, by way of example, with reference to the accompanying drawings in which:

FIG. 17 is a flow diagram illustrating the computation sequence for a 3×3 matrix multiplication using the linear MWAP array shown in FIG. 16;

DETAILED DESCRIPTION OF THE PREFERRED EMBODIMENTS

The MWAP uses a modular structure for both the processing hardware and for programming the system. The system architecture can be implemented with a linear processing array, a two-dimensional processing array, or an n-dimensional processing array, where n is an integer (NOTE: because the MWAP does not require a global clock like the systolic array processor, propagation delays won't limit the size of the array.) The basic linear MWAP array architecture, shown in FIG. 1, consists of a host interface 10 operably connected to a dual port memory linking element 12, multiple processing element/dual port memory linking element pairs 14, and a host output interface 16. The dual port memory linking element may be composed of memory chips or a set of registers.

Figure 1A:
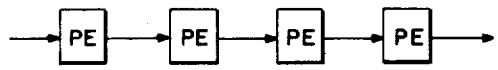
FIG. 1 illustrates the general architecture of prior art array processors, FIG. 1A illustrating a linear array and FIG. 1B illustrating a 3×3 square array.
Figure 1B:
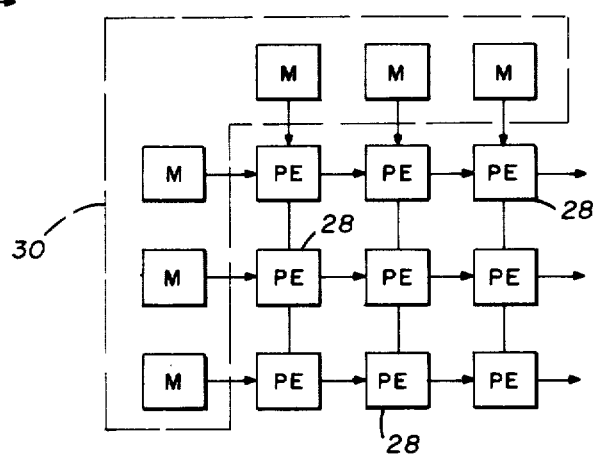

Asynchronous local communication is provided between each processing element and its adjacent dual port memory linking elements. Data, coefficients used in calculations, intermediate calculations and/or other information can be stored in selected memory locations in each dual port memory linking element. Asynchronous communication between processing elements occurs, for example, as data and other information is written into a memory location in dual port memory linking element 22, by one processing element 20, and is acquired, after appropriate handshaking, by another adjacent processing element 24. In this example, processing element 20 is not required to write data into the dual port memory linking element 22 in the same order that data is used by the receiving processing element 24. In fact, processing element 24 may pass through data or information from the adjacent dual port memory element 22 to adjacent dual port memory 26 without processing the data or information, and allowing a downstream processing element to acquire that data or other information for its processing purposes. (The prior art array processing architecture is shown in FIG. 1, contains an array of processing elements 28 which are directly interconnected. Memory blocks 30 are located external to the processing array and along its edges. As will be shown later in the Specification, many algorithm computations are difficult and cumbersome with the prior architecture.) In the MWAP architecture, each processing element may access memory locations in a right adjacent dual port memory element and a left adjacent dual port element. Therefore, the asynchronous local communication provided via the dual port memory linking elements makes available global communication within the processing array.

As will be discussed in greater detail by specific example, linking the processing elements with dual port memory linking elements provides the following advantages: (1) global communications; (2) data and computation can be propagated to the right or left; (3) the distance between data elements can increase or decrease between processing stages; (4) coefficients and other information can be stored between processing stages during an initialization phase; and, (5) both single and two-dimensional algorithms can be processed using a linear array.

Since the asynchronous link occurs between the processing element and the dual port memory linking element, a hardware control flag located in the dual port memory element can replace a software control token. This feature, which shall be described later, allows data driven/local control to be obtained using asynchronous hardware handshaking between a processing element and its adjacent dual port memory linking elements. Once the processor array is initialized, data and information is rhythmically read from one dual port memory element and output flows to a down stream dual port memory with each processing element self-timed by the availability of data in its adjacent dual port memory elements.

Figure 3:
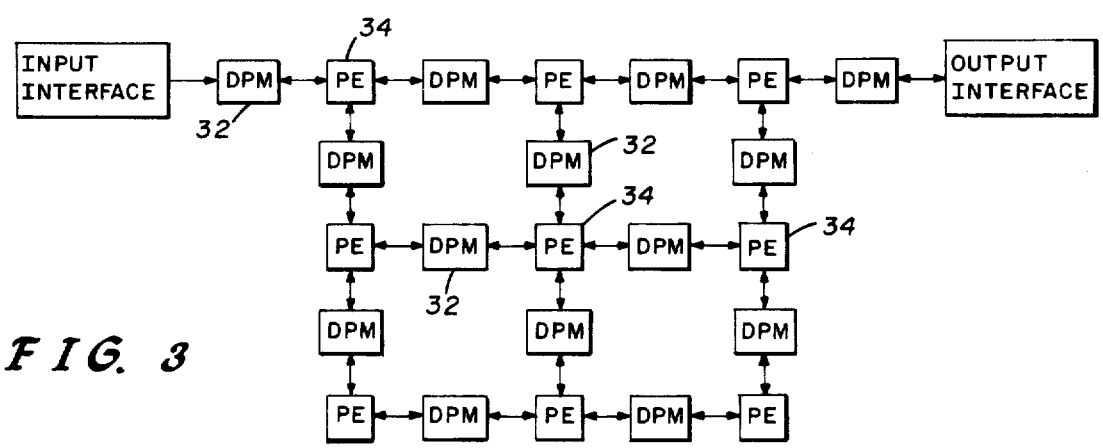
FIG. 3 is a block diagram illustrating a two-dimensional geometric array structure for the Memory-Linked Wavefront Array Processor, as taught by the present invention.

FIG. 3 is a block diagram illustration of the basic MWAP architecture for a two-dimensional processing array. As with the linear array, dual port memory linking elements 32 are interspersed between processing elements 34 in the array. A processing element 34 may have direct access to adjacent dual port memory linking elements to its right and left as well as up and down in the array. Processing element 32 and dual port memory linking element 34 in the two-dimensional array, operate similar to those elements in the linear array. The basic MWAP architecture can be extended by application of this invention to any n-dimensional array. It is further within the scope of the present invention to use n-port memory linking elements and n-port processing elements, where n is greater than two.

Figure 2:
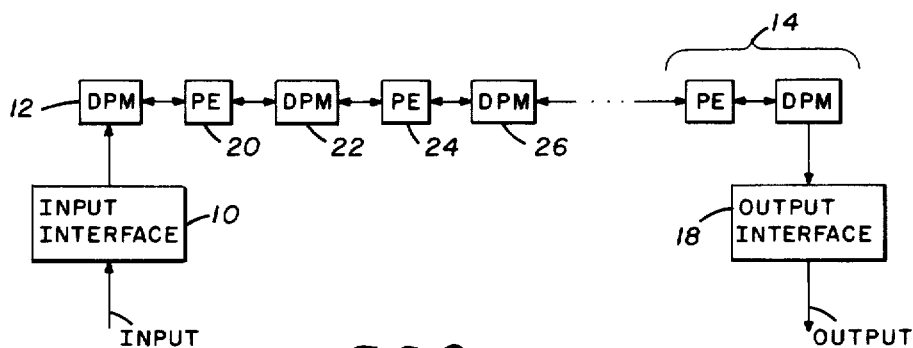
FIG. 2 is a block diagram illustrating a linear array Memory-Linked Wavefront Array Processor, as taught by the present invention.
Figure 4:
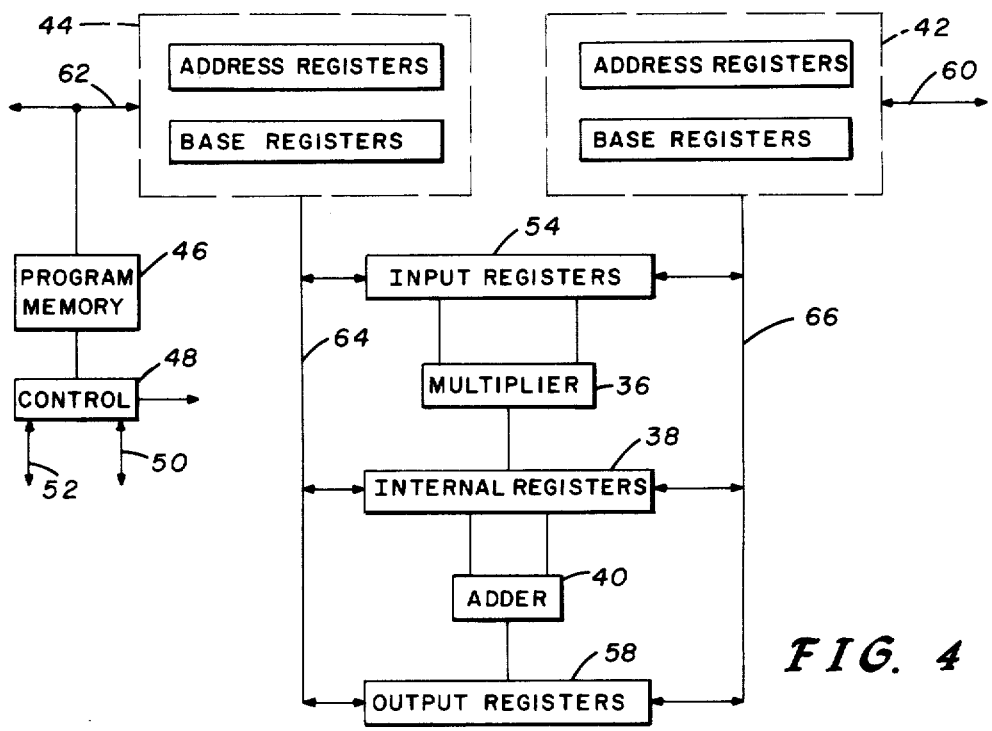
FIG. 4 is a block diagram of a processing element used in a linear MWAP array.

FIG. 4 is a block diagram illustrating one embodiment of the modular processing element, as taught by the present invention for use in a linear MWAP array. The processing element can be separated into three sections: the arithmetic section (elements 36, 38, 40), the addressing registers (elements 42, 44), and the program flow control block (or control logic, elements 46, 48). The arithmetic section consists of two arithmetic processors (36, 40), internal arithmetic registers 38, and associated data bus structure. The address registers consist of a group of eight counter/register pairs (42, 44) for each memory port the processing element can access. FIG. 4 shows two groups of address registers so that each processing element can access dual-port memory linking elements to its right and left (see FIG. 2). Address registers 42 are used to address memory locations in the right adjacent dual-port memory linking element; and address registers 44 are used to address memory locations in the left adjacent dual-port memory linking element. The control logic section contains a program memory 46 and associated logic 48 to make the processing element programmable.

Control unit 48 senses and either sets or resets hardware control flags in the right adjacent dual port memory linking element via line 50, and in the left adjacent dual port memory linking element via line 52. Control unit 48 will suspend operation of the processing element when the program sequence calls for one of the address registers (42, 44) to access its adjacent dual port memory element and a control flag in that dual port memory element associated with that memory field (or associated with that particular address register) remains down. The control unit will continue to suspend activity of the processing element until that particular flag in the adjacent dual port memory linking element has been set by the other processing element adjacent to the particular dual port memory linking element. In this way, the processing unit is self-timing and will remain inactive until the required data is available. Thus, each processing element will have asynchronous data driven local control. Since the processing element suspends operation during those periods when a control flag indicates unavailability of data, there is no chance for the contamination of data by two processing elements attempting to read and write into the same memory location simultaneously. Each control flag in the dual port memory linking elements have two states, and the control unit in the adjacent processing elements are programmed so that when a flag is in a particular state it will appear to be a set flag to one of the adjacent processing elements and a reset flag to the other adjacent processing element.

Further, the invented architecture may use two or more registers to access different data locations in a particular adjacent dual port memory linking element. Since each dual port memory element may have two or more control flags (each control flag associated with an address register in said adjacent dual port memory element), memory overlapping is possible. In other words, a processing element to the right of a particular dual port memory linking element may read or write data using one of its address registers from a first location in a particular dual port memory element and a processing element to the left of that particular dual port memory element may simultaneously read or write data into a second memory location in that dual port memory element. In this example, flag 1 (located in the dual port memory element and associated with the first memory location), would appear set to the right processing element and re-set for the left processing element; and, flag 2 (also located in the dual port memory) will be reset for the right processing element and set for the left processing element.

It will also be noted from the bus structure in FIG. 4, that the processing element can read or write from the left dual port memory from bus 62, while simultaneously reading or writing from the right dual port memory means from bus 60. This is possible because the internal bus arrangement (64, 66) provides separate access to the input registers 54 and the output registers 58 from either said right port 60 or said left port 62. Further, instruction words stored in the program memory 46 have separate fields to control read/write operations from the right port 60 and said left port 62. Thus, a read or write to the left port and a read or write to the right port may all occur in the same instruction cycle. Similarly, bus arrangement (64, 66) as well as the use of internal registers 38 separating the multiplier/divider 36 from the adder/subtractor 40, allow simultaneous multiplication/division and addition/subtraction to occur. Again, the instruction words stored in program memory 46 have separate fields to control the multiplier, adder, and left and right data port addresses. Since these operations can occur in parallel, a multiply, add or subtract, or a read or write to the left port, and a read or write to the right port may all occur in the same instruction cycle.

Figure 5:
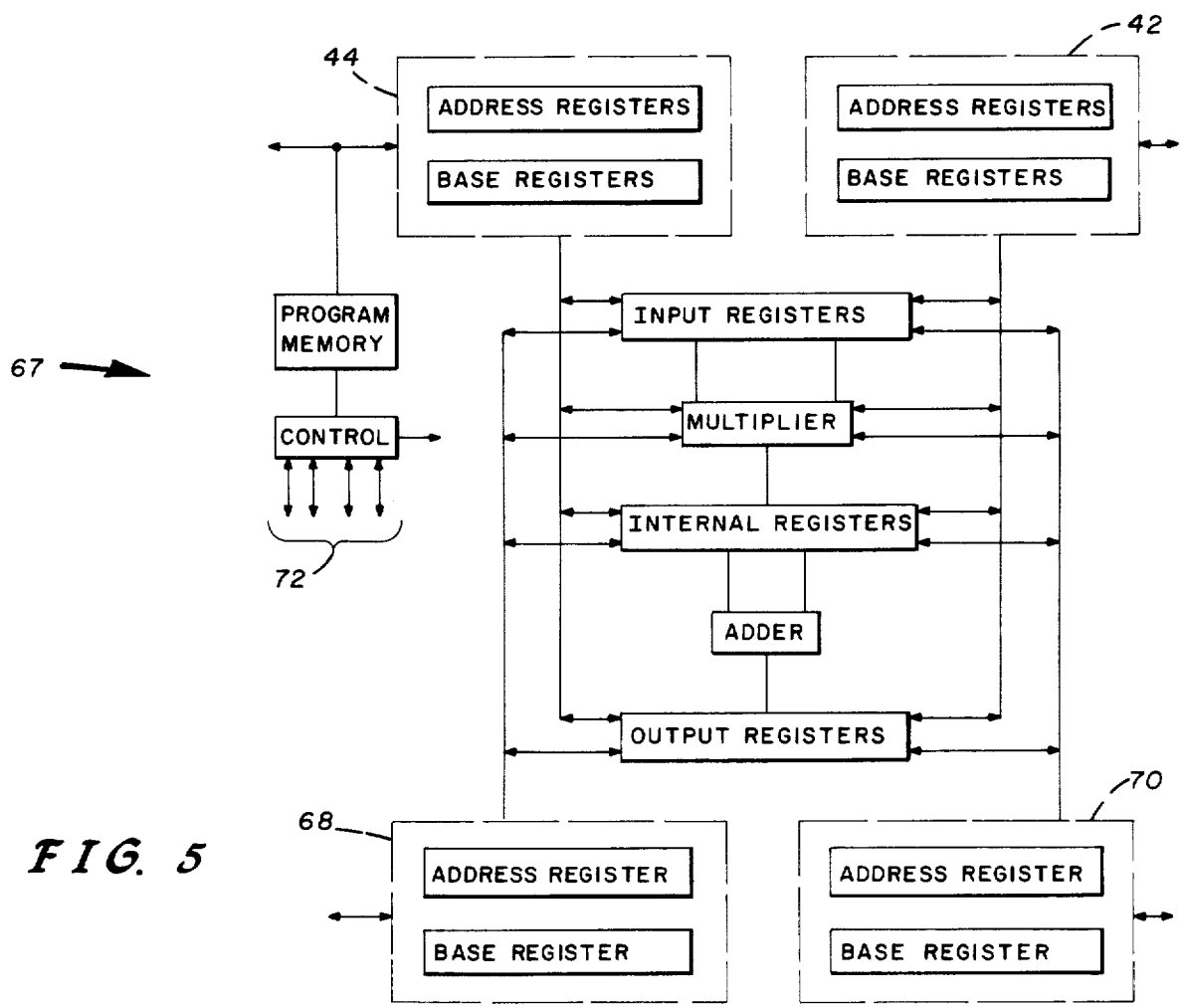
FIG. 5 is a block diagram of a processing element used in a two-dimensional MWAP array.

FIG. 5 is a block diagram illustrating one embodiment of a processing element for use in a two-dimensional processing array. The basic processing element used in the linear array (see FIG. 4) is similar to that used for a two-dimensional array; except that processing element 67 has four separate sets of address registers (42, 44, 68 and 70) to access adjacent dual port memory lining elements located to the right, left, and up and down in the two dimensional array from the processing element. Similarly, four control lines 72 sense and set or reset hardware control flags in the adjacent right, left, up and down dual port memory linking elements. As described above, overlapping of memory using two or more control flags in each dual-port memory linking element, and the simultaneous read or write to the left, right, up and down dual port memory elements, as well as simultaneous add/subtraction and multiplication are all features also obtained in the MWAP two-dimensional array.

Figure 6:
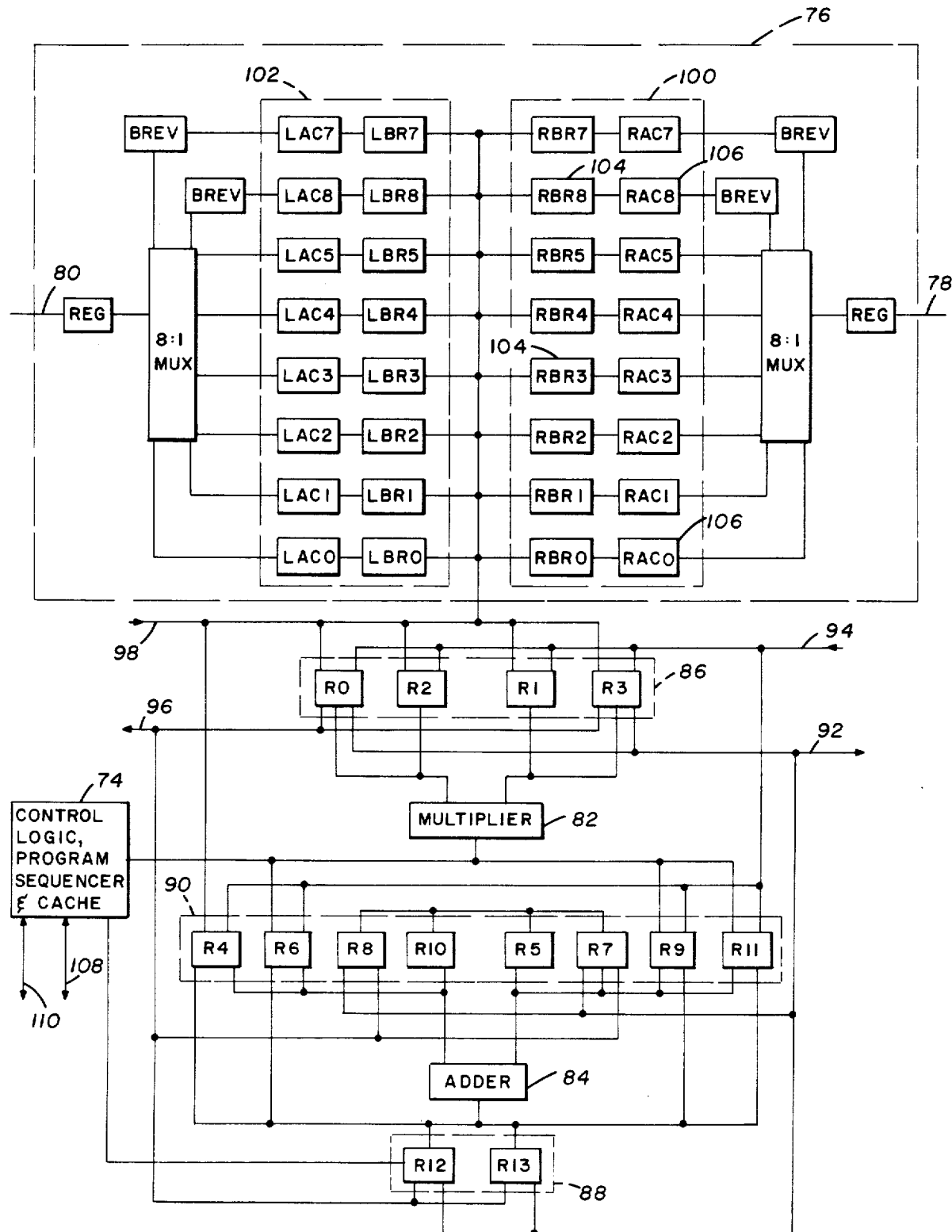
FIG. 6 is a detailed block diagram illustrating the internal register and bus arrangement for a typical processing element in the MWAP.

FIG. 6 represents a more detailed block diagram of the modular processing element as taught by the present invention. In order to reduce the complexity of the following discussions, FIG. 6 shows a processing element used in a linear array. However, it is to be understood that it is within the scope of this invention to extend the particular structure shown in FIG. 6 to any multi-dimensional array.

The processing element consists of: a control unit 74 having an instructional cache and program sequencer; a block of memory address registers 76 to address adjacent dual port memory linking elements (not shown) along right address bus 78 and left address bus 80; a floating point multiplier 82; a floating point arithmetic section (ALU) 84; input registers 86; output registers 88; and, internal arithmetic registers 90. The output registers 88, input registers 86, and internal arithmetic registers 90 are each separately connected to right output bus 92, right input bus 94, left output bus 96 and left input bus 98. Input/output buses (92, 94) are operably coupled to the right dual port memory linking element and input/output buses (96, 98) are operably coupled to the left dual port memory linking element. Once the instructional cache, located in control unit 74, is loaded, program and data memory are separate. All memory addressing is done by reference to the memory address registers 76 which can read, or read and then incremented, or read and then reset to a base address assigned during the program load. The processing element can simultaneously read or write to memory locations in the adjacent right dual port memory linking element and the adjacent left dual port memory linking element. Control lines 108 and 110 enabled the control unit 74 to sense and set, or reset, hardware control flags located in the adjacent left or adjacent right dual port memory linking element. As discussed earlier, the control unit 74 will suspend the processing operation of the particular processing element when a program instruction calls for address register 76 to access a memory location in an adjacent dual port memory element and an associated control flag in said adjacent dual port memory element has not as yet been set.

The arithmetic section consists of fourteen arithmetic registers (label R0 through R13 in FIG. 6), a floating point multiplier 82 and, a floating point adder/subtracter 84. The registers 90 are connected using a specialized bus structure designed to support multiply and accumulation algorithms. Only two registers (R0 and R13) are connected to both the left and right input buses (94, 98) and both output buses (92, 96). Six registers are attached to input buses only (R1, R2, R4, R6, R9 and R11), and four are available to output buses only (R7, R8, R12 and R13). Two registers, R5 and R10, are not connected to any input or output bus. This structure supports efficient real and complex number operations with a minimal number of registers and interconnects.

The multiplier, adder/subtracter, left and right data ports are independently controlled by separate fields in the processing element instruction words. Since the separate instruction fields allow these operations to occur in parallel, a multiply, an addition or subtraction, and read/write by to the left port, or read/write to the right port, may all occur in the same instruction cycle.

The addressing section consists of two groups (100, 102) of eight counter/register pairs. One group 102 serves as the left address counters (LAC0 to LAC7) and the other group 100 serves as the right address counters (RAC0 to RAC7). Associated with each address counter is a base register 104. This base register is used to hold a reference memory address for the counters. During each instruction that memory is referenced, a counter 106 that supplied the address can be incremented, or reset to the value in its base address register, or the counter can remain unchanged. To facilitate the generation of addresses when performing the fast fourier transform and similar algorithms, the outputs of address counters LAC6, LAC7, RAC6 and RAC7, are placed on the address bus in bit reverse order. The transform size associated with this bit reversal is programmable.

Figure 7:
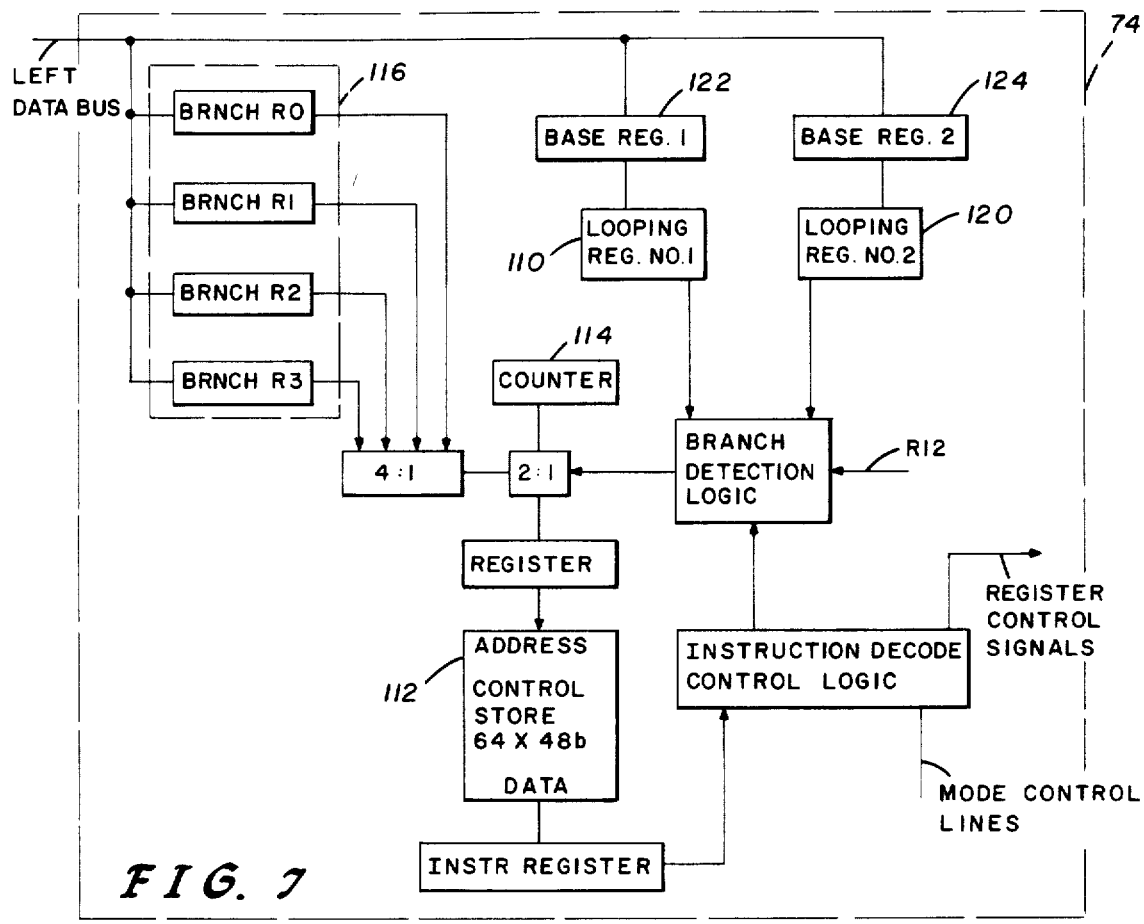
FIG. 7 is the sequencer block diagram for a typical MWAP processing element.

An expanded block diagram of the programming sequence section 74 is shown in FIG. 7. It contains a program memory 112, a program address counter 114, and four program branch address registers 116. In addition, there are two looping counters 118, 120 (LOOP 1 and LOOP 2) that are used for conditioning branching out of the loops. The base register (122, 124) are attached to each counter for resetting the loop count. One counter can be modified during each instruction cycle. It can be either incremented, decremented or reloaded from its base register. In addition to these loop counters, arithmetic register 112 (see FIG. 6) can be used for conditional branching. This allows conditioning branching that is data dependent.

Figure 8:
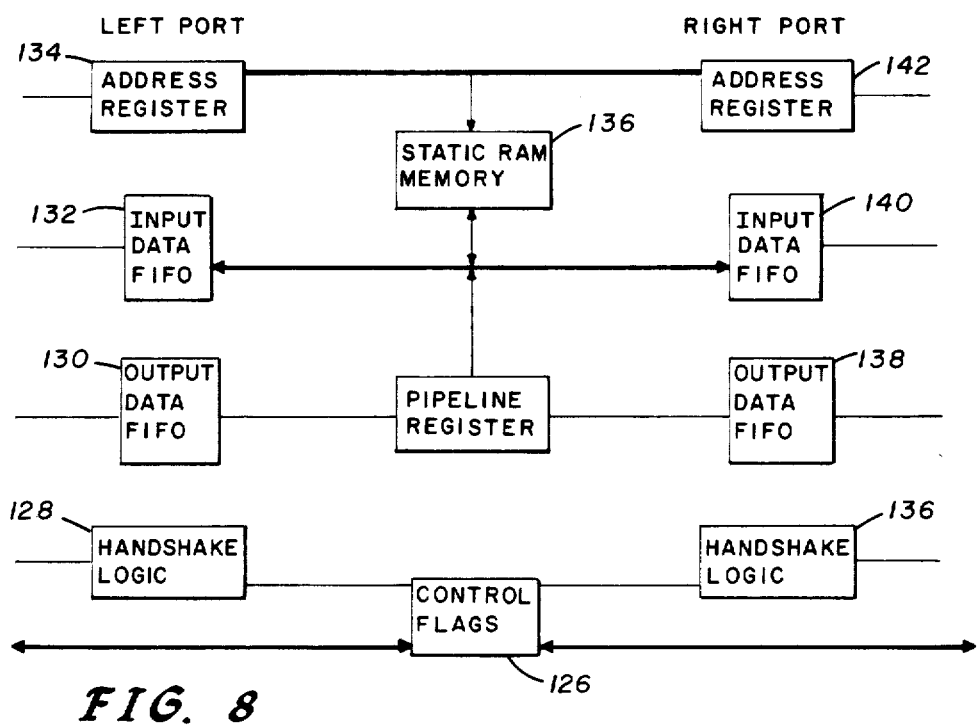
FIG. 8 is a block diagram showing the internal structure of a dual-port memory linking element used in the MWAP architecture.

FIG. 8 is a block diagrammatic view of the dual port memory linking element as taught by the present invention. The dual port memory linking element has two unique features: (1) it is asynchronously driven at its boundary, and (2) it contains two flags 126. Data flow in the MWAP is controlled by these flags. These flags are used to indicate the availability of data to an adjacent processing element. Any instruction that uses LAC0 or RAC0 (see FIG. 6) in the processing element as the address for memory access is not executed unless control flag 1 in the associated dual port memory linking element is set. If an instruction of this type attempts execution when flag 1 is not set, the instruction execution halts until access is permitted by the setting by the control flag. When the flag is set, the instruction execution begins. In a similar way, flag 2 controls the execution of instructions referencing LAC 1 and RAC 1 (see FIG. 6). If the dual port memory linking element depicted in FIG. 8 were located in the array to the left of the processing element depicted in FIG. 6, the address register 142 on the right port of the dual-port memory linking element would connect to bus 76, the input data fifo 140 and output data fifo 138 would respectively be connected to buses 98 and 96 and the right port handshake logic 136 would connect to control lines 108. Similarly, address register 134, input data fifo 132, output data fifo 130 and handshaking logic 128 associated with the left port of the dual port memory linking element would connect to similar elements in a processing element located to its left. Static RAM memory 136 can therefore be accessed by the processing element to its adjacent left and its adjacent right. As discussed previously, with the use of two control flags, the adjacent processing elements can have overlapping access to different portions of static RAM 136. This would enable to left adjacent processing element and the right adjacent processing element simultaneous access to different portions of static RAM 136.

Operation of the Memory-Linked Wavefront Array Processor (MWAP) and some of its properties are illustrated with the following implementation of a Finite Input Response (FIR) Filter for signal processing. The equation for a FIR filter is:

$$Y(n) = \sum_{k=0}^{N} b(k) * x(n - k)$$

Writing out the first few terms for a two state filter, i.e., N=2 we have:

|  | PE#3 | | | |
| --- | --- | --- | --- | --- |
| Y(0) = | b(0) × (0) | PE#2 | | |
| Y(1) = | b(0) × (1) + | b(1) × (0) | PE#1 | |
| Y(2) = | b(0) × (2) + | b(1) × (1) + | b(2) × (0) | |
| Y(3) = | b(0) × (3) + | b(1) × (2) + | b(2) × (1) | |
| Y(4) = | b(0) × (4) + | b(1) × (3) + | b(2) × (2) | |

Figure 9:
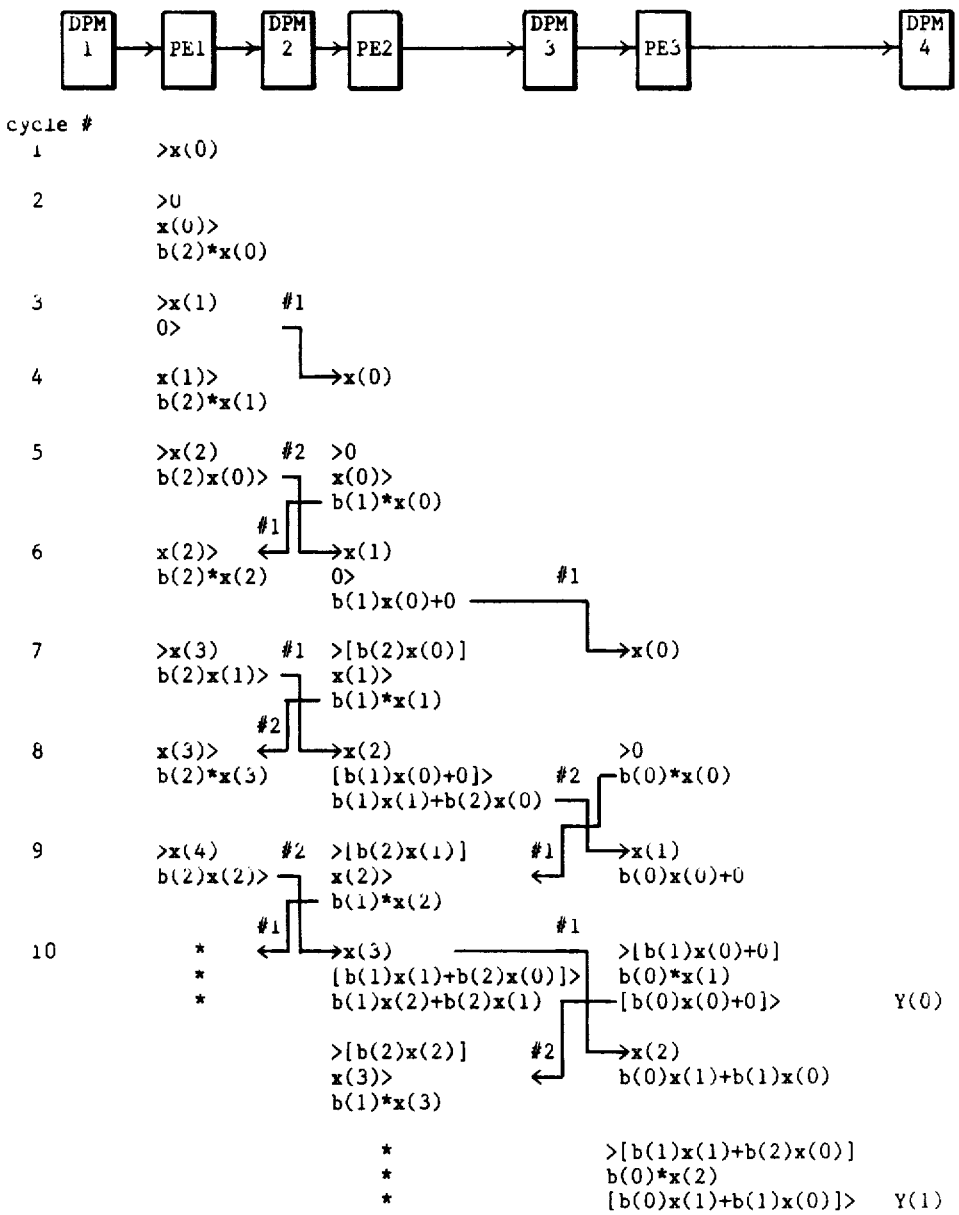
FIG. 9 is a flow diagram illustrating the FIR filter processing sequence for a MWAP.

Once all of the filter coefficients, b(n), are read into the processing elements each Processing Element (PE) in the MWAP computes one term of the wavefront b(k)x(i), and forwards the input x(i) and partial sum to the next PE. The first PE reads the input data stream and the last PE sends the output Y(i) to the host computer or system bus. The FIR algorithm is calculated using the linear array shown in FIG. 9; and the sequence of events is also illustrated for several processing cycles in FIG. 9. Cycles 1 and 2 essentially inialize the array. (The notation > indicates the direction data is being read or written, for example, in cycle 1, data x(0) is being read from DPM #1 and in cycle #2 data x(2) is being written into DPM2). In cycles 3 through 5 processing element #1 reads x(1) from the memory to its left, computes the b(2)x(1) term, and writes both x(1) and the previous product b(2)x(0) into the memory to its right, using the base address specified by memory address register #1. As PE #1 completes storing the partial sum and x(1) in the memory to its right, it sets control flag #1 in that memory to notify PE #2 that data is ready for it to process. (Note:the notation #1 and #2 connected to an arrow indicates the setting and resetting of Flag 1 and 2, respectively.) PE #1 then repeats the process for x(2) using memory address register #2 and control flag #2. This sequence is repeated using first address register #1 and control flag #1 and then address register #2 and control flag #2 to process all input samples x in the left memory. If the host is continuously entering new data samples into the left most memory, the MWAP can continuously filter the input data forever.

When the control flag #1 is set, processing element #2 reads x(n) and the partial sum from the memory to its left. It then resets control flag #1, to permit PE #1 to use that section of the memory again, and adds the product b(1)x(n+1) term to the partial sum to obtain the new partial sum b(2)x(n)+b(1)x(n+1). The data sample x(n) and the previous partial sum is written into the memory to its right, using the base address specified by its memory address register #1. As PE #2 completes storing the partial sum and x(n) in the memory to its right, it sets the control flag #1 in that memory to notify PE #3 that data is ready for it to process. PE #2 then repeats the process for x(n+1) using its memory address register #2 and control flag #2 in the memory to its left; setting control flag #2 in the memory to its right. The sequence is repeated over and over just as with the first processing element.

Processing element #3 reads the partial sum and x from the memory to its left, adds the product b(0)x(n+2) to the partial sum and puts the answer in the memory to its right using the same sequence of memory address registers and control flags as described for processing elements #1 and #2. Thus, the results Y(0), Y(1), ... are written into the right-most dual port memory for reading by the host computer.

The FIR processing sequence illustrates several properties of the Memory-Linked Wavefront Array Processor:

1. Computations flow through the MWAP. Once inialized, input data is rhythmically read from the left memory linking element with results output to the right memory linking element. In the example processing sequence, data is input, processed, and output every two process cycles.
2. The MWAP is self-timing (there is no need for a global clock controlling the individual PEs), i.e., the flow of computations is controlled by the two flags in each dual port memory. Note that the use of two control flags permits overlapping of data buffers (e.g., the PE to the right and left of a dual-port memory linking element can simultaneously access different memory locations in that dual-port memory linking element). In fact, two control flags generally permit efficient processing of any MWAP algorithm.
3. The MWAP throughput rate depends only on the number of processing elements/linking memory pairs used and the algorithm implemented; not on the size of the data set processed or the length of the computation. For example, the MWAP throughput rate does not change for longer (more stages) FIR filters if one additional PE/Memory linking pair is used for each additional stage in the filter.

Not only can a broad class of one-dimension algorithms be easily implemented on the MWAP; the MWAP is easily extended to increase its throughput rate. This can be illustrated with the following solution of the 1-D heat conduction equation:

$$T_i^{n+1} = aT_{i+1}^n + bT_i^n + cT_{i-1}^n$$

Using the FIR structure discussed above:
Let:
b(0)=a
b(1)=b
b(2)=c
and
x(i)=T(i) for a given n
Then:

| | PE#3 | | |
|---|---|---|---|
| $T^{n+1}(*) =$ | $aT^n(0)$ | PE#2 | (initialization step) |

-continued

| | | | |
|---|---|---|---|
| $T^{n+1}(0) =$ | $aT^n(1) +$ | $bT^n(0)$ | PE#1 |
| $T^{n+1}(1) =$ | $aT^n(2) +$ | $bT^n(1) +$ | $cT^n(0)$ |
| $T^{n+1}(2) =$ | $aT^n(3) +$ | $bT^n(2) +$ | $cT^n(1)$ |
| $T^{n+1}(3) =$ | $aT^n(4) +$ | $bT^n(3) +$ | $cT^n(2)$ |

Figure 10:
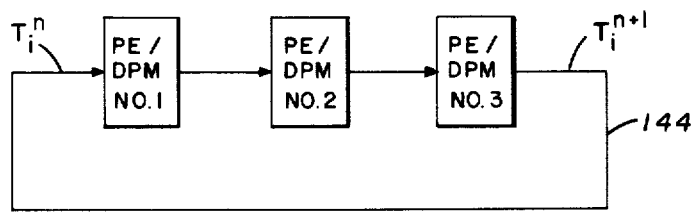
FIG. 10 illustrates the use of a MWAP data loop back to calculate multiple points in the 1-D heat conduction equation.

With these substitutions, the same algorithm used for the FIR filter on the MWAP can be used to solve a single point, n, in the 1-D heat equation with each interaction of the MWAP. In addition, the MWAP output could be looped back to the input to compute multiple sets of n without host intervention, as shown in FIG. 10. As an alternative arrangement, rather than having the data loop back along bus 144 the linear array could be programmed so that data and calculations flow first to the right through the array and then flow back to the left allowing additional sets to be computed; and, then flow again reverses and data and calculations flow to the right were the answers are retrieved by the host computer from the right most dual-post memory element. Changing the direction of flow is accomplished merely by programming a change in the base registers. This feature, allowing both right and left flow of data and calculations is not taught by the prior art processing arrays.

Figure 11:
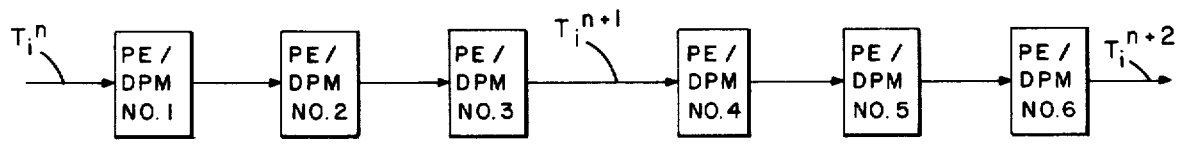
FIG. 11 illustrates the use of a MWAP for simultaneous computation of multiple points in the 1-D heat conduction equation.

The throughput rate of the MWAP could be increased by using multiple sets of three processing element/linking memory pairs to compute more than one point, n, at the same time. This extension is illustrated in FIG. 11. Note that the loop back scheme shown in FIG. 10 could be used in the FIG. 11 configuration to compute multiple points before returning data to the host. These examples illustrate three additional properties of the MWAP:

4. The asynchonous dual-port memory linking elements permit simple extension of the MWAP processor to any length (size). Since there is no global clock controlling each PE propagation delays will not limit the size of the processing array.
5. Different algorithms can be loaded into the same MWAP for execution, or the MWAP can can contain several different algorithms in its program memory at the same time allowing one to change the function computed by simply changing the starting address in the PE program cache. If a linear array of processor elements contain more elements than required for a given algorithm, the results can simply be propagated to the last dual-port memory linking element without change.
6. More than one computation (function) can be applied to the input before the data is returned to the host. That is, algorithms can be cascaded in the MWAP. The instruction sequence stored in the program cache of each PE determines the calculation functions provided by the PE.

Figure 12:
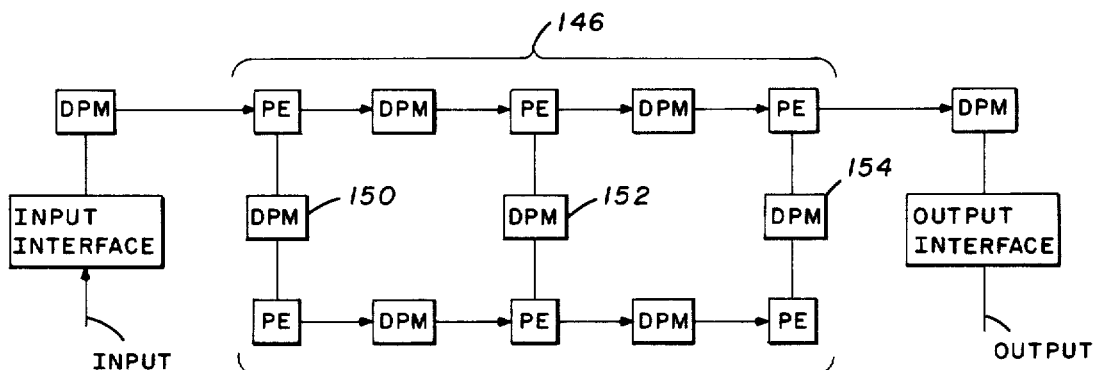
FIG. 12 illustrates the use of a two dimensional MWAP to compute partial differential equations with variable coefficients.

If the coefficients a, b and c, in the heat conduction equation are not constant, each processing element can be programmed to compute the next value of its coefficient as data flows through the array. This extension permits the MWAP to handle partial differential equations with variable coefficients. However, the throughput rate of the processor will decrease by the time required to compute the new value of a coefficient. A more elegant solution is to use a two dimensional MWAP array as shown in FIG. 12. In this configuration, the first row of processor/linking memory elements 146 executes the algorithm for computation of the heat conduction equation. The second row of processor elements 148 computes the next value of the coefficients, to be used by the first row of processor elements. The coefficient values are stored in the columns of dual-port memory linking elements (150, 152, 154) for use by the top row of processors as needed. Thus, the throughput rate for the MWAP is increased as the computation of new coefficients is done in parallel with the computation of the heat conduction equation.

MWAP CONFIGURATION PROPERTIES

The MWAP can compute two-dimensional array problems using a linear array of processor/memory elements. To illustrate the importance of this property of the Memory-Linked Wavefront Array consider the broadcast, systolic, and wavefront array algorithms for multiplication of two non-sparse matrices:

$$C = A*B$$

where:

$A = [A(i,j)]$ and $B = [B(i,j)]$

The calculations below show the multiplication process for a $3 \times 3$ matrix:

$$\begin{bmatrix} A(11) & A(12) & A(13) \\ A(21) & A(22) & A(23) \\ A(31) & A(32) & A(33) \end{bmatrix} * \begin{bmatrix} B(11) & B(12) & B(13) \\ B(21) & B(22) & B(23) \\ B(31) & B(32) & B(33) \end{bmatrix} = \begin{bmatrix} C(11) & C(12) & C(13) \\ C(21) & C(22) & C(23) \\ C(31) & C(32) & C(33) \end{bmatrix}$$

$C(11) = A(11) * B(11) + A(12) * B(21) + A(13) * B(31)$
$C(21) = A(21) * B(11) + A(22) * B(21) + A(23) * B(31)$
$C(31) = A(31) * B(11) + A(32) * B(21) + A(33) * B(31)$ $C(12) = A(11) * B(12) + A(12) * B(22) + A(13) * B(32)$
$C(22) = A(21) * B(12) + A(22) * B(22) + A(23) * B(32)$
$C(32) = A(31) * B(12) + A(32) * B(22) + A(33) * B(32)$ $C(13) = A(11) * B(13) + A(12) * B(23) + A(13) * B(33)$
$C(23) = A(21) * B(13) + A(22) * B(23) + A(23) * B(33)$
$C(33) = A(31) * B(13) + A(32) * B(23) + A(33) * B(33)$

If matrix A is decomposed into columns $A\{x\}$ and matrix B is decomposed into rows $B\{y\}$, then the product of A and B can be computed by:

$$C = A\{1\}*B\{1\} + A\{2\}*B\{2\} + \ldots + A\{N\}*B\{N\} \qquad [1]$$

This approach can be used for Matrix Multiplication by broadcasting the columns of A and rows of B instantly along a square array; with the inner-products then sequentially summed via a program loop in each processor. This type of prior art implementation is shown in FIG. 13.

Figure 13:
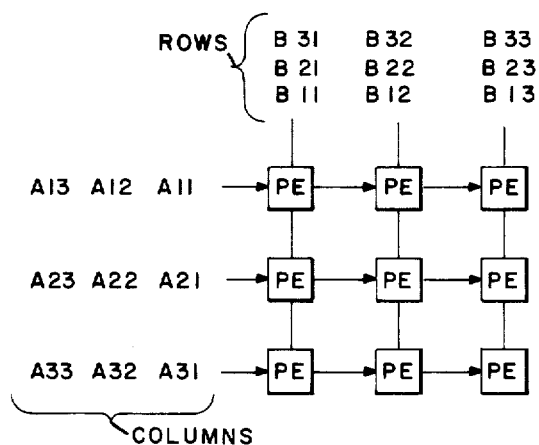
FIG. 13 illustrates the use of a prior art broadcast array for full-matrix multiplication.

In the broadcast array of FIG. 13, columns of A and rows of B are input to the processing elements from the left and top respectively. The two data, Aij and Bij, are multiplied as they meet at a processing node and added to the product Cij; the data value currently residing in a register at a node. Note, that the initial value of the Cij register in all node is zero. When the register has been updated, the Aij and Bij data items are then passed to the next processor. As all the column and row data arrive at the processor nodes, all of the products of equation [1] will be sequentially summed. This design requires global communication to broadcast the row and column data, which cannot be accomplished by prior art systolic or wave array processors. There is also the additional problem of reading the result out of the array back to a host processor.

The product C can also be computed using the inner product accumulation:

$$C(0,i,j) = 0$$
$$C(k,i,j) = C(k-1,i,j) + A(i,j)*B(j,i) \text{ For } k = 1, 2, \ldots, N. \qquad [2]$$

Figure 14:
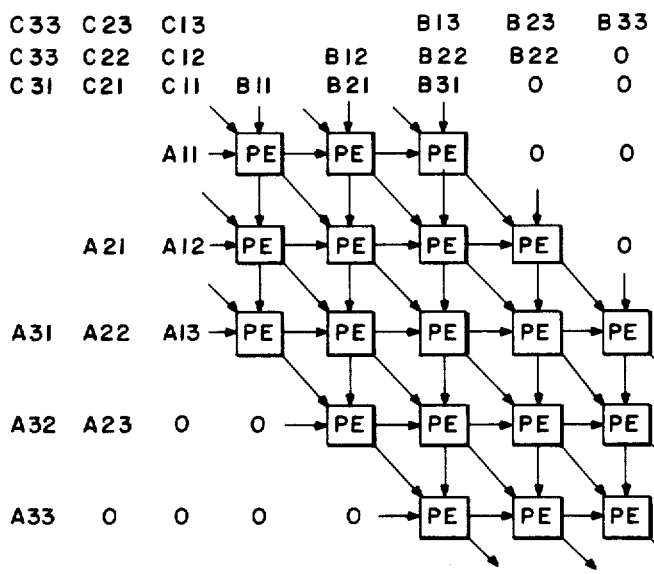
FIG. 14 illustrates the use of a prior art hex-connected systolic array to compute matrix multiplication.

One prior art implementation for matrix multiplication using inner product accumulation is the systolic array shown in prior art FIG. 14. For the example problem, A is propagated into the left edge of the processors, B is propagated into the top edge of processors, and C (initially 0) is prorated diagonally through the array from the upper left corner. Global clocking of the array, used in the systolic array, requires each processing element to process data at each clock pulse. Thus, the different columns of B and rows of A have to be adjusted by the extra zeros shown, in order to arrive at each processing element at the correct time. As each set of A's arrive at a processor element, they are multiplied and added to the current partial sum in the processing element. The result is propagated out of the array on the bottom diagonal.

If readout of the products is ignored, successive products can be obtained in N cycles. But that is the problem! How does one readout the N products in the systolic array? The products can be shifted out, which requires additional processor cycles, each processor element can be interfaced to the host computer, which greatly adds to the complexity of the system, or the processors can be bused in rows or columns to the host. Thus, communication with the host is critical affecting the complexity of the system, data communication rate requirements, and the system throughput rate.

The wavefront array processor uses the concept of a computation wavefront traveling down the processor array. Each processor modifies a term in the wavefront and acts as a secondary source responsible for the propagation of the wavefront. Thus, a wavefront in the processing array corresponds to a mathematical recursion in the algorithm. Successive pipelining of the wavefronts computes all recursions in the algorithm.

Figure 15:
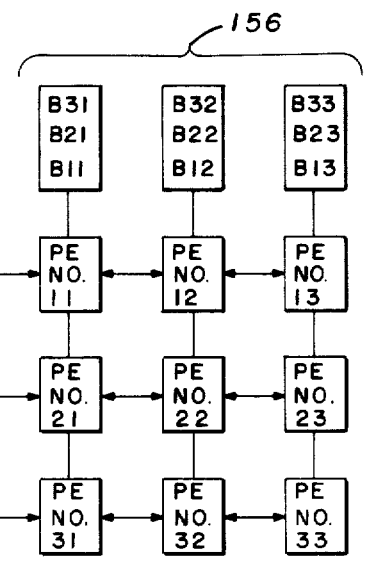
FIG. 15 illustrates the use of a prior art wavefront array to compute matrix multiplication.

A prior art Wavefront Array processor for matrix multiplication is shown in prior art FIG. 15. Note that memory 156, 158 in the prior art array is placed on the top and left sides of the array of processor. To implement matrix multiplication on this type of array, the registers of all the processing elements are initially set to zero:

$$C(0,i,j) = 0 \quad \text{for all i and j;}$$

the entries for $A(i,j)$ are stored in memories to the left (in columns), and the entries for $B(i,j)$ are stored in memories on the top (in rows). The process starts with PE(1,1) where:

$$C(1,11) = C(0,11) + A11*B11$$

is computed. The computation wavefront then propagates to the neighboring PE's (1,2) and (2,1), which compute:

$$C(1,12) = C(0,12) + A11*B12$$

and $$C(1,21) = C(0,21) + A21*B11$$

As this first wave propagates through the array, an identical second wavefront (recursion) can execute in parallel immediately after the first. Thus, at the same time PE(1,2) and PE(2,1) are computing C(1,12) and C(1,21) respectively, PE(1,1) computes:

$$C(2,11)+C(1,11)+A12*B21$$

This pipelining is feasible because the wavefronts of two successive recursions will never intersect. The processors executing the recursions at any given instant will be different; avoiding any contention problem. In fact, with the capability to propagate an initialization zero between problems, a second new multiplication problem can be started as soon as the first processing element has completed all recursions for the first problem.

Figure 16:
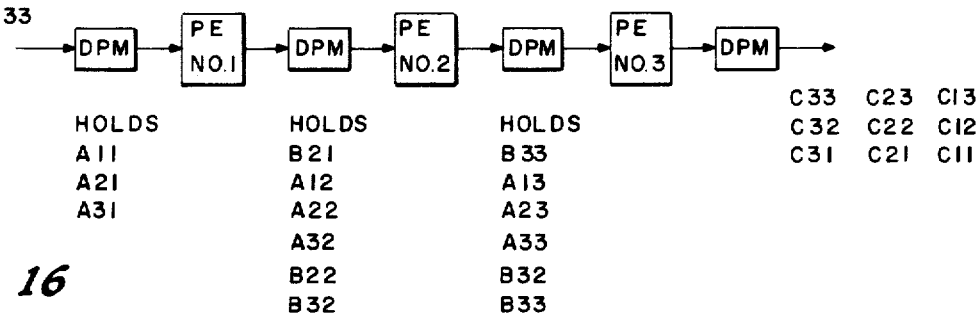
FIG. 16 illustrates the use of a linear MWAP array to compute matrix multiplication as taught by the present invention.

FIGS. 16 and 17 illustrate that this matrix multiplication problem which is so difficult and cumbersome to handle on the systolic array or the prior art wavefront array can be simply handled on the MWAP architecture. In fact, whereas the prior art wavefront array processor requires a two-dimensional processing array, the problem can be handled by MWAP in a simple linear array. FIG. 16 illustrates that the multiplication can be accomplished in a three-processor linear array by storing data and coefficient in the dual port memory (PPM) between processing stages. Interleaved columns of the matrix B and rows of the matrix A shown are entered in reverse order from the bottom to the top of the matrix. The rows of matrix A are entered in reverse order from right to left. Each processing element computes one term of the partial sum for each output term C(ij) as they are prorated through the array. The computation sequence is outlined in FIG. 17.

Each processor element in the MWAP essentially does the computations of a vertical row of processors in the systolic or prior art wavefront implementation. This is made possible by holding coefficient in the dual-port memory linking elements between the processing elements. The first fourteen cycles shown in FIG. 17 are initialing the array by loading coefficients for the multiplication. The time to do this corresponds to the time required to load coefficients into the memories along the edge of a prior art wavefront array.

Computations begin flowing through the array on the 15th cycle. Note that once output starts on the 22nd cycle, results are stored in the last dual-port memory linking element every two processor cycles. From this point in time on, computation and output occur simultaneously. No additional time is required to read the results from the array, as was the case with the systolic array example. Pairs of matrices may be continuous entered from the left, with results read from the right of the MWAP array.

It can be seen in FIG. 17 that the computation time for each row of the output matrix is 2N+1 processor cycles, where N is the size of the square matrix. The total computation time for the multiplication of two square matrices of size N is N(2N+1) processor cycles. Thus, the computation time for N processors to compute an N X N product is approximately proportional to N squared. That this is approximately the same, or slightly better than, the performance obtained with a systolic or prior art wavefront array can be seen as follows: Assume one has nine processors to use in computing a 9×9 full matrix multiplication. If a linear MWAP array is used, it will require approximately 9(2*9+1) or 171 processor cycles. Using a systolic or prior art wavefront array requires that the product be done by matrix partitioning. Partitioning the A and B matrices into 3×3 matrices result in:

$$\begin{bmatrix} A(11) & A(12) & A(13) \\ A(21) & A(22) & A(23) \\ A(31) & A(32) & A(33) \end{bmatrix} * \begin{bmatrix} B(11) & B(12) & B(13) \\ B(21) & B(22) & B(23) \\ B(31) & B(32) & B(33) \end{bmatrix} = \begin{bmatrix} C(11) & C(12) & C(13) \\ C(21) & C(22) & C(23) \\ C(31) & C(32) & C(33) \end{bmatrix}$$

$$C(11) = A(11) * B(11) + A(12) * B(21) + A(13) * B(31)$$
$$C(21) = A(21) * B(11) + A(22) * B(21) + A(23) * B(31)$$
$$C(31) = A(31) * B(11) + A(32) * B(21) + A(33) * B(31)$$

Where A(ij), B(ij), and C(i,j) are all 3×3 matrices.

As a N x N systolic or prior art wavefront array can compute a N x N matrix product in approximately N processor iterations, the computation of each C(ij) term will require 3*N or 9 processor iterations. Thus computation of the entire C matrix for prior art arrays will require 9×9 or 81 processor iterations plus the time required to perform 18 matrix additions. The basic iteration for matrix multiplication with a prior art wavefront array is:

FETCH B, UP
FETCH A, LEFT
FLOW A, RIGHT
FLOW B, DOWN
MULT A, B, D
ADD C, D, C

This iteration requires six processor cycles. The approximate time to compute the 9×9 matrix product is then 486 processor cycles using the prior art wavefront array. If the cycle time for the two processors is the same, the MWAP array is then approximately 2.5 times faster than the prior art wavefront array. The above comparison illustrates two additional properties of the MWAP:

7. The simultaneous computation and multidirectional communication capability of the MWAP yields a significant increase in its throughput rate. In fact, for most algorithms the MWAP will be faster than either a systolic or prior art wavefront array.
8. The use of linking memory permits a single linear MWAP array to implement a board variety of both 1-D and 2-D geometry algorithms.

Use of MWAP to Calculate Fast Fourier Transforms (FFT)

As discussed earlier, calculating the Fourier transform using the recursion formula is impossible using prior art systolic or wavefront array processing. The discrete Fourier transform defined by the equation, $$X(k) = \sum_{n=0}^{N-1} x(n) W_N^{kn} \text{ for } k = 0, 1, \ldots, N-1$$

where: $W_N = e^{-j(2\pi/N)}$ can be calculated with a systolic or prior art wavefront array. However, the discrete formula is not as desirable as the recursion formula because it requires N processors and N processor cycles or N squared operations to compute a transform of length N.

The Fourier transform recursion formula is as follows:

$$x^{(m+1)}(p) = x^{(m)}(p) + W^r x_N^{(m)}(q)$$

$$x^{(m+1)}(q) = x^{(m)}(p) - W^r x_N^{(m)}(q).$$

with p, q and r varying from stage to stage. This Fast Fourier Transform, (FFT), calculation requires only N*log₂(N) operations to compute a transform of size N. Thus the recursion formula is faster than direct computation using the discrete Fourier transform. However, the distance between the input computation points changes (increases) for each stage in the computation using the recursion formula. This can be seen FIG. 18 which is a signal flow graph for the decimation-in-time constant-geometry FFT algorithm. This variation in the distance between input data points, or global communication requirement, makes it impossible to implement the FFT using the recursion formula on a systolic or prior art wavefront array.

Figure 18:
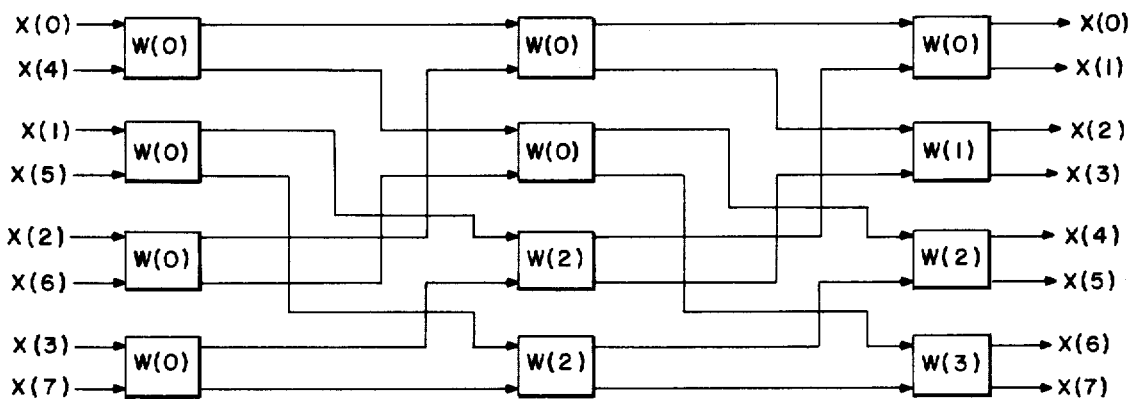
FIG. 18 illustrates the shuffle-exchange needed to compute the Fourier Transform using the recursion formula; and, FIG. 19 illustrates the computation sequence used by a MWAP to compute the Fourier Transform using the recursion formula.

One method using the MWAP for implementing the FFT using the recursion formula would be to use a processing element for each term in the algorithm with the processors interconnected as shown in FIG. 18. This would require N processors for a N point transform.

Figure 19:
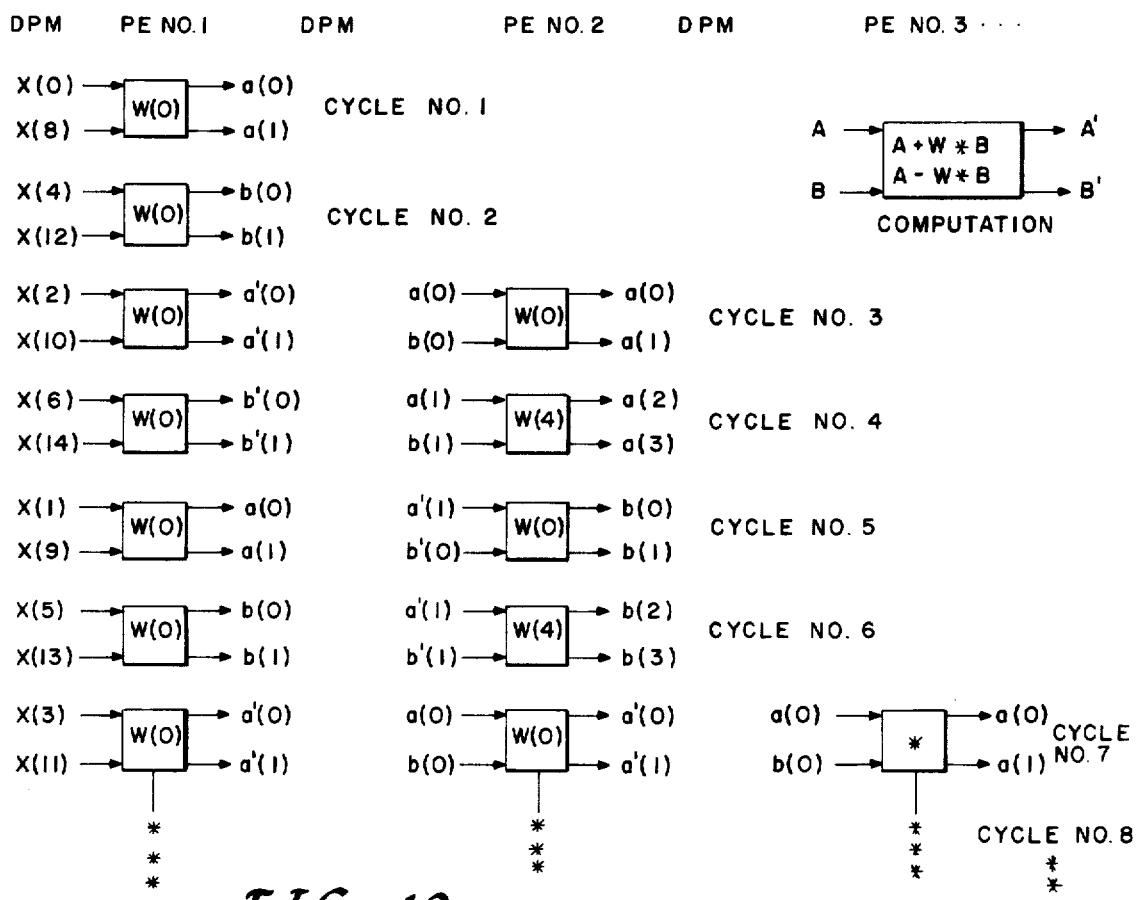

However, the same linear array Memory-Linked Wavefront Array Processor used in the previous examples can compute the Fast Fourier Transform. To implement the FFT on the MWAP, the input is stored in the first dual-port memory linking element in bit-reversed order, the W coefficients are stored in the dual-port memories linking elements between stages in bit-reversed order, and the sum and difference terms are propagated between processors using two base address registers. This makes the addressing of coefficients and data between stages linear, as can be seen in FIG. 19. The MWAP computes the FFT as follows:

1. Each stage of the FFT is implemented using one MWAP processing module which computes X(p)+W(r)*X(q) and X(p)−W*(r)X(q).
2. The processor at each stage alternates between using memory address register A and memory address register B to output |p-q| length blocks of sum and difference products to the dual-port memory linking elements to its right.
3. The processor at each stage reads computation points from the dual-port memory linking elements to its left alternately using memory address base resistor A and B.

The algorithm is illustrated in FIG. 19 with time snapshots of the computation of a 16-point FFT. The MWAP implements the FFT using ln(N) processors for a size N transform and performs multiple Fourier Transforms, of length N, in N/2 systolic cycles. Thus, the MWAP architecture that can implement algorithms that are not possible with systolic or prior art wavefront arrays.

Obviously many modifications and variations of the present invention are possible in light of the above teachings. It is therefore to be understood that within the scope of the appended claims the invention may be practiced otherwise than as specifically described.

What is claimed is:

1. A memory linked wavefront array processor comprising:
    a linear array of processing elements, each processing element having right and left independent ports,
    a means for providing a dedicated data flow path with information storage between each pair of adjacent processing elements and permitting simultaneous data transfer between all adjacent processing elements, said means comprising,
        a plurality of dual port memory linking means interspersed in said array between processing elements, each particular memory linking means connected to the right independent port of its left adjacent processing element and the left independent port of its right adjacent processing element for providing a dedicated data flow path with information storage between such adjacent processing elements; and,
    a means for providing independent asynchronous local control of each processing element in said linear array, said means comprising,
        at least two control flags corresponding with each dual port memory linking means for permitting control of overlapping data flow in that particular dual port memory linking means, and
        a local control means within each particular processing element for (a) setting, resetting and testing a control flag corresponding with a dual port memory linking means adjacent to said particular processing element; (b) suspending execution of an instruction by said particular processing element when a tested control flag specified in the instruction is false and, (c) completing the instruction when said flag becomes true, so that the array processor is locally driven to process wavefronts of calculations passing through the array.

2. The processor of claim 1, wherein each control flag comprises a hardware circuit having two alternate states.

3. The processor of claim 1, wherein each processing element further comprises a right address register for addressing memory locations in its right adjacent dual port memory linking means and a left address register for addressing memory locations in its left adjacent dual port memory linking means.

4. The processor of claim 3, wherein said right address register comprises a plurality of right base registers with each right base register connected to a right address counter and each right address counter connected to an address bus of said right adjacent dual port memory linking means, wherein each right base register holds a reference memory address for its corresponding right address register, and wherein said left address register comprises a plurality of left base registers with each left base register connected to a left address counter and each left address counter connected to an address bus of said left adjacent dual port memory linking means, wherein said left base register holds a reference memory address for its corresponding left address counter, and wherein each processing element includes a program means with associated logic for sequencing operations of the particular processing element and for independently selecting between incrementing, resetting to the base address, and holding the current count for any particular address register, during the same instruction cycle that memory is required.

5. The processor of claim 4, wherein at least one of said address counters are connected to said address bus in bit reverse order.

6. The processor of claim 1, wherein each processing element includes a local clock, so that each processing element is self timed not requiring a global clock.

7. The processor of claim 1, further comprising:
an input interface having a first port coupled to a host computer and a second port coupled to a dual port memory linking means that is coupled to the first processing element in the array; and,
an output interface having a first port coupled to said host computer and a second port coupled to a dual port memory linking means that is coupled to the last processing element in the array.

8. The processor of claim 1, wherein each processing element further comprises:
input registers,
output register,
internal arithmetic registers, and wherein said right and left independent ports simultaneously connect to said input registers, output registers and internal arithmetic registers.

9. The processor of claim 8, wherein each processing element further comprises:
an arithmetic section comprising a multiplier and an adder/subtracter; and,
a bus structure means coupling said multiplier and said adder/subtracter to said internal registers for supporting simultaneous operation of said multiplier and said adder/subtracter.

10. The processor of claim 9, wherein each processing element further comprises a program memory with associated logic for sequencing the operation of said particular processing element and wherein said instruction words stored in said program memory to sequence the operation of said particular processing element have separate fields to control the multiplier, the adder/subtracter and read/write operations from said right and said left independent ports, wherein multiply, add/subtract and read/write to the left independent port and read/write to the right independent port can occur simultaneously during the same instruction cycle.

11. The processor of claim 1, wherein each processing element includes a program memory for storing several different program sequences for computing different algorithms, and a means for changing the starting address in each program memory, so that different processing elements in said linear array can perform different computations.

12. The processor of claim 1, wherein data and computation can be propagated of the right or left in said linear array of processing elements.

13. The processor of claim 1, wherein throughput can be increased by increasing the number of processing element/dual port memory linking pairs.

14. The processor of claim 1, wherein each dual port memory linking means comprises a means for loading and storing coefficients and other information between processing element stages in said array.

15. The processor of claim 1, wherein said memory linked waveform array processor is an n-dimensional structure wherein n is a positive integer defining the geometric dimension of said structure, and wherein said linear array of processing elements is a component of said n-dimensional structure.

16. A memory linked wavefront array processor comprising:
an array including (a) at least one interface (I) to a host computer, (b) a plurality of processing elements (PE), each processing element having two independent ports, and (c) a plurality of dual port memory elements (M), all interconnected in the form of $\{I, M_o, PE_o \ldots M_n, PE_n\}$, where n is a positive integer and wherein each dual port memory element positioned between adjacent processing elements provides a dedicated data flow path with information storage between such processing elements; and,
a means for providing asynchronous local control of each processing element in said array, said means comprising,
at least two control flags corresponding with each dual port memory element for permitting control of overlapping data flow in that particular dual port memory linking elements, and
a local control means within each particular processing element for (a) setting, resetting and testing a control flag corresponding with a dual port memory element adjacent to said particular processing element; (b) suspending execution of an instruction by said particular processing element when a tested control flag specified in the instruction is false and, (c) completing the instruction when said flag becomes true, so that the array processor is locally driven to process wavefronts of calculations passing through the array.

17. The processor of claim 16, further comprising a second interface to said host computer having a first port connected to said host computer and a second port connected to a dual port memory element that is connected to an independent port of the last processing element ($PE_n$) in said array.

18. The processor of claim 16, wherein each control flag comprises a hard wire circuit having two alternate states.

19. A memory-linked wavefront array processor comprising:
a two-dimensional structure of processing elements, each processing element having at least two independent data ports,
a plurality of memory linking means having at least two ports each particular memory linking means interspersed in said structure between adjacent processing elements and connected to an independent data port of such adjacent processing elements, for providing a dedicated data flow path with information storage between such adjacent processing element; and,
a means for providing independent asynchronous local control of each processing element in said structure, said means comprising,
at least two control flags corresponding with each memory linking means for permitting control of overlapping data flow in that particular memory linking means, and
a local control means within each particular processing element for (a) setting, resetting and testing a control flag corresponding with a memory linking means adjacent to said particular processing element; (b) suspending execution of an instruction by said particular processing element when a tested control flag specified in the instruction is false; and, (c) completing the instruction when said flag becomes true, so that said array processor is locally driven to process wavefronts of calculations passing through the array.

20. The processor of claim 19, wherein each control flag comprises a hardwire circuit having two alternate states.

21. The processor of claim 19, wherein said memory linking means is a dual port memory.

22. The processor of claim 19, further comprising:
   an input interface having a first port coupled to a host computer, and a second port coupled to a memory linking means that is coupled to a first processing element within said structure; and,
   an output interface having a first port coupled to said host computer, and a second port coupled to a memory linking means that is coupled to a second processing element within said structure.

23. A memory-linked wavefront array processor comprising:
   a positive n-dimensional structure of processing elements, wherein n is an integer defining the geometric dimension of said structure, each processing element having at least two independent data ports,
   a plurality of memory linking means having at least two ports, each particular memory linking means interspersed in said array between adjacent processing elements and connected to an independent data port of such adjacent processing elements, for providing a dedicated data flow path with information storage between such adjacent processing elements; and,
   a means for providing independent asynchronous local control of each processing element in said structure, said means comprising,
      at least two control flags corresponding with each memory linking means for permitting control of overlapping data flow in that particular memory linking means, and
      a local control means within each particular processing element for (a) setting, resetting and testing a control flag corresponding with a memory linking means adjacent to said particular processing element; (b) suspending execution of an instruction by said particular processing element when a tested control flag specified in the instruction is false; and (c) completing the instruction when said flag becomes true, so that the array processor is locally driven to process wavefronts of calculations passing through the array.

24. The processor of claim 23, wherein each control flag comprises a hardware circuit having two alternate states.

* * * * *